United States Patent
Nito et al.

(10) Patent No.: US 12,476,574 B2
(45) Date of Patent: Nov. 18, 2025

(54) DRIVE APPARATUS

(71) Applicant: TOYOTA JIDOSHA KABUSHIKI KAISHA, Aichi-ken (JP)

(72) Inventors: Yu Nito, Toyota (JP); Tatsuya Nishino, Toyota (JP); Kazuki Minami, Toyota (JP); Junichiro Yasui, Seto (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 163 days.

(21) Appl. No.: 18/414,294

(22) Filed: Jan. 16, 2024

(65) Prior Publication Data

US 2024/0243687 A1 Jul. 18, 2024

(30) Foreign Application Priority Data

Jan. 18, 2023 (JP) ................................. 2023-006203

(51) Int. Cl.
| | | |
|---|---|---|
| *H02P 21/20* | (2016.01) | |
| *H02K 7/116* | (2006.01) | |
| *H02P 21/05* | (2006.01) | |
| *H02P 21/22* | (2016.01) | |
| *H02P 25/026* | (2016.01) | |
| *H02P 29/50* | (2016.01) | |

(52) U.S. Cl.
CPC .............. *H02P 29/50* (2016.02); *H02K 7/116* (2013.01); *H02P 21/05* (2013.01); *H02P 21/20* (2016.02); *H02P 21/22* (2016.02); *H02P 25/026* (2013.01)

(58) Field of Classification Search
CPC .......... H02P 29/50; H02P 21/05; H02P 21/20; H02P 21/22; H02P 25/026; H02K 7/116; H02K 11/30; F16H 1/04
USPC ............................. 318/400.23, 400.01, 700
See application file for complete search history.

(56) References Cited

U.S. PATENT DOCUMENTS 7,746,023 B2 * 6/2010 Ajima .................. G01D 5/2046
318/700

FOREIGN PATENT DOCUMENTS

JP 2019-118171 A 7/2019

* cited by examiner

*Primary Examiner* — David Luo
(74) *Attorney, Agent, or Firm* — HAUPTMAN HAM, LLP

(57) ABSTRACT

A drive apparatus includes: (a) an electric motor including a rotor and a stator that has a stator core and a stator coil; (b) a gear connected to a shaft of the rotor; and (c) a control device configured to control a drive current flowing through the stator core. The gear has a number of teeth which makes an order of a fluctuation of a meshing torque generated in the gear coincide with an order of a torque ripple generated in the electric motor. When a magnitude of vibration of the gear caused by the torque ripple and the fluctuation of the meshing torque exceeds a predetermined determination value, the control device is configured to execute a harmonic superposition control for superposing a harmonic current on a fundamental wave of the drive current such that the magnitude of the vibration of the gear is reduced.

5 Claims, 6 Drawing Sheets

DRIVE APPARATUS

This application claims priority from Japanese Patent Application No. 2023-006203 filed on Jan. 18, 2023, the disclosure of which is herein incorporated by reference in its entirety.

FIELD OF THE INVENTION

The present invention relates to a drive apparatus that includes a gear and a control device, wherein the gear is connected to a shaft of a rotor of an electric motor, and wherein the control device is configured to control a drive current of the electric motor.

BACKGROUND OF THE INVENTION

There is known a drive apparatus in which an order of a torque ripple generated in an electric motor and an order of a fluctuation of a meshing torque in a gear connected to a shaft of a rotor of the electric motor coincide with each other, and a control is executed to avoid resonance caused by the torque ripple and the fluctuation of the meshing torque. For example, Patent Document 1 discloses such a drive apparatus.

PRIOR ART DOCUMENT

Patent Document

[Patent Document 1]
Japanese Patent Application Laid-Open No. 2019-118171

SUMMARY OF THE INVENTION

The drive apparatus described in Patent Document 1 is provided with a clutch configured to connect and disconnect between the gear and the shaft of the rotor of the electric motor. The clutch is controlled such that a phase of a magnetic pole of the rotor and a phase of meshing of the gear are opposite to each other, whereby vibration in the drive apparatus is suppressed. Thus, the drive apparatus described in Patent Document 1 requires the clutch, thereby requiring a place for disposing the clutch, and leading to an increase in cost and an increase in weight.

The present invention has been made in view of the above circumstances, and an object of the present invention is to provide a drive apparatus capable of suppressing vibration while suppressing an increase in cost and an increase in weight.

The present invention provides a drive apparatus including: (a) an electric motor including a rotor and a stator that has a stator core and a stator coil; (b) a gear connected to a shaft of the rotor; and (c) a control device configured to control a drive current flowing through the stator core. The gear has a number of teeth which makes an order of a fluctuation of a meshing torque generated in the gear coincide with an order of a torque ripple generated in the electric motor. When a magnitude of vibration of the gear caused by the torque ripple and the fluctuation of the meshing torque exceeds a predetermined determination value, the control device is configured to execute a harmonic superposition control for superposing a harmonic current on a fundamental wave of the drive current such that the magnitude of the vibration of the gear is reduced.

In the drive apparatus according to the present invention, (a) the number of teeth of the gear is set to a value that makes the order of the fluctuation of the meshing torque generated in the gear coincide with the order of the torque ripple generated in the electric motor, and (b) the control device is configured to execute the harmonic superposition control for superposing the harmonic current on the fundamental wave of the drive current such that the magnitude of the vibration of the gear is reduced, when the magnitude of vibration of the gear caused by the torque ripple and the fluctuation of the meshing torque exceeds the predetermined determination value. With the harmonic superposition control being executed, the vibration of the gear caused by the torque ripple generated in the electric motor and the fluctuation of the meshing torque generated in the gear is suppressed. Therefore, the vibration in the drive apparatus is suppressed while suppressing an increase in cost and an increase in weight. For example, where such a drive apparatus is mounted on a vehicle, vibration of the vehicle body and noise in the vehicle interior are suppressed while increases in vehicle cost and weight are suppressed.

DETAILED DESCRIPTION OF PREFERRED EMBODIMENT

Figure 1:
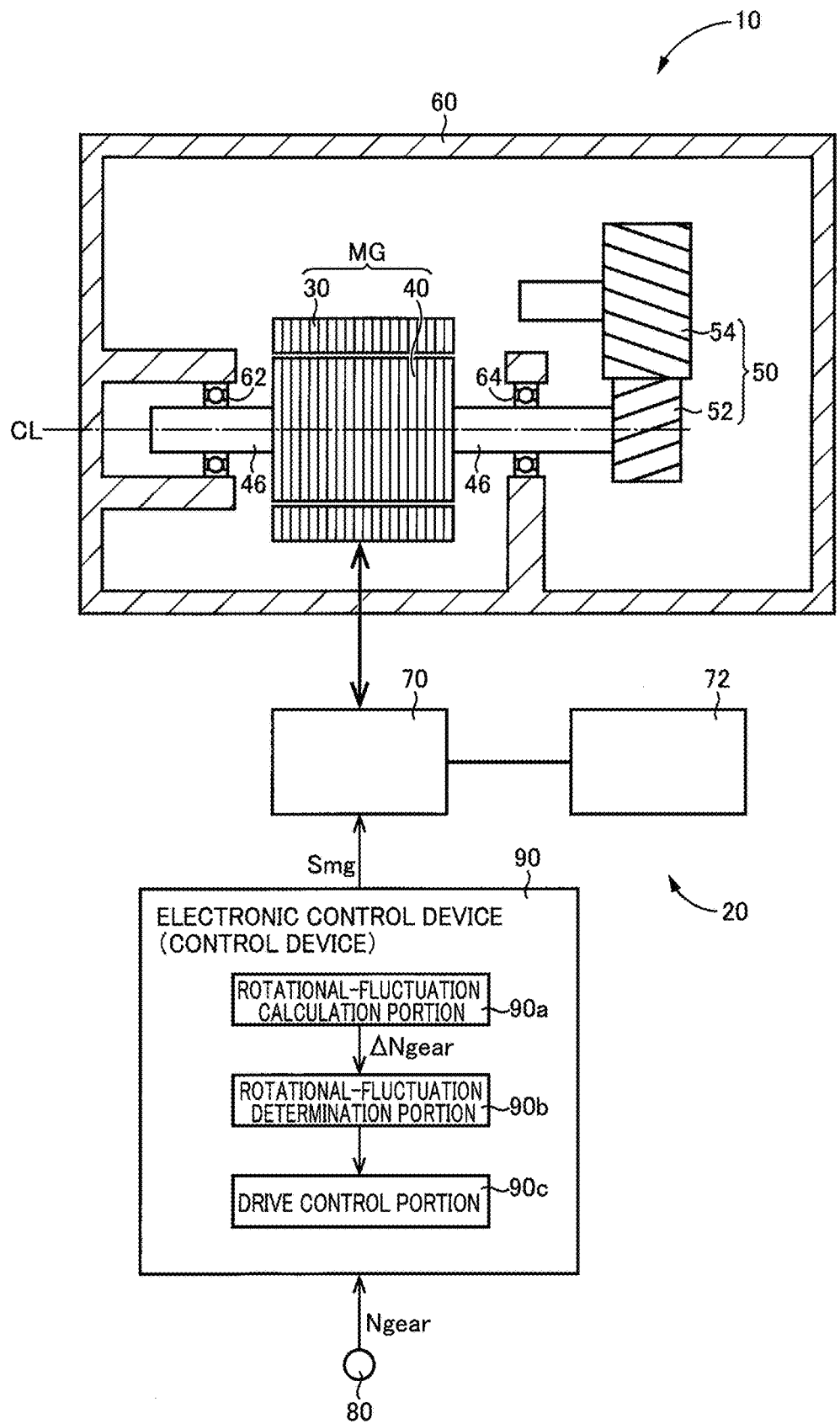
FIG. 1 is a schematic view of a driving apparatus according to an embodiment of the present invention.

Hereinafter, an embodiment of the present invention will be described in detail with reference to the drawings. In the drawings of the embodiment, the drawings are simplified or modified as appropriate, and dimensional ratios, shapes, and the like of respective parts are not necessarily accurately drawn. In the present specification, "direction parallel to an axis CL", "circumferential direction around the axis CL" and "radial direction around the axis CL" are simply referred to as "direction of the axis CL", "circumferential direction" and "radial direction", respectively.

Embodiment

FIG. 1 is a schematic view of a drive apparatus 20 according to an embodiment of the present invention.

The drive apparatus 20 is a drive apparatus mounted on a vehicle 10 such as a hybrid electric vehicle or an electric vehicle, for driving the vehicle 10. The drive apparatus 20 includes an electric motor MG, a drive gear 52, a driven gear 54, an inverter 70, a battery 72 and an electronic control device 90.

The electric motor MG is a power source mounted on the vehicle 10 for driving the vehicle 10. The electric motor MG is, for example, a so-called motor generator having an electric motor function and a power generator function, and is a three-phase synchronous electric motor. The electric motor MG is, for example, an embedded magnet type (interior permanent magnet type).

The electric motor MG includes a cylindrical stator 30 and a rotor 40. The stator 30 has a center lying on an axis CL about which the rotor 40 is to be rotated. The rotor 40 is disposed inside the stator 30.

The rotor 40 is rotated by a rotating magnetic field generated by the stator 30. A rotor shaft 46 is made of, for example, steel. The rotor shaft 46 is a rotary shaft provided in the rotor 40, and is to be rotated about the axis CL. The rotor shaft 46 is supported by a case 60 through a bearing 62 and a bearing 64. The bearing 62 is provided on an end portion of the rotor shaft 46, and the bearing 64 is provided in another end portion of the rotor shaft 46. The rotor shaft 46 corresponds to "shaft" in the present invention.

The drive gear 52 is a gear connected to the rotor shaft 46 so as not to be rotatable relative to the rotor shaft 46. The driven gear 54 is a gear that meshes with the drive gear 52. The drive gear 52 and the driven gear 54 constitute a pair of gears 50. The driven gear 54 is connected to a drive wheel (not shown) of the vehicle 10. An electric motor torque Tmg [Nm], which is an output torque of the electric motor MG, is transmitted to the drive wheels via the pair of gears 50. The drive gear 52 corresponds to "gear" in the present invention.

The inverter 70 is a power supply circuit that is provided between the electric motor MG and the battery 72 and converts a direct current into an alternating current or converts the alternating current into the direct current under control of the electronic control device 90. The electric motor torque Tmg is controlled by the inverter 70 controlled by the electronic control device 90.

The battery 72 is a chargeable and dischargeable secondary battery such as a lithium-ion battery or a nickel-hydrogen battery. The battery 72 is used to supply an electric power for driving the electric motor MG as a power source, and to charge the electric power generated by the electric motor MG by regeneration.

The electronic control device 90 is a controller including a control device that controls each part in the vehicle 10, and includes, for example, a so-called microcomputer in which a CPU performs signal processing in accordance with a program stored in advance in a ROM while using a temporary storage function of a RAM. The electronic control device 90 corresponds to "control device" in the present invention.

The electronic control device 90 receives various signals (for example, a gear rotational speed Ngear [rpm] that is a rotational speed of the drive gear 52) based on detection values, from various sensors (for example, a rotational speed sensor 80) provided in the vehicle 10.

The electronic control device 90 outputs various command signals (for example, an electric motor control signal Smg for controlling driving of the electric motor MG) to devices (for example, the electric motor MG) provided in the vehicle 10.

Figure 2:
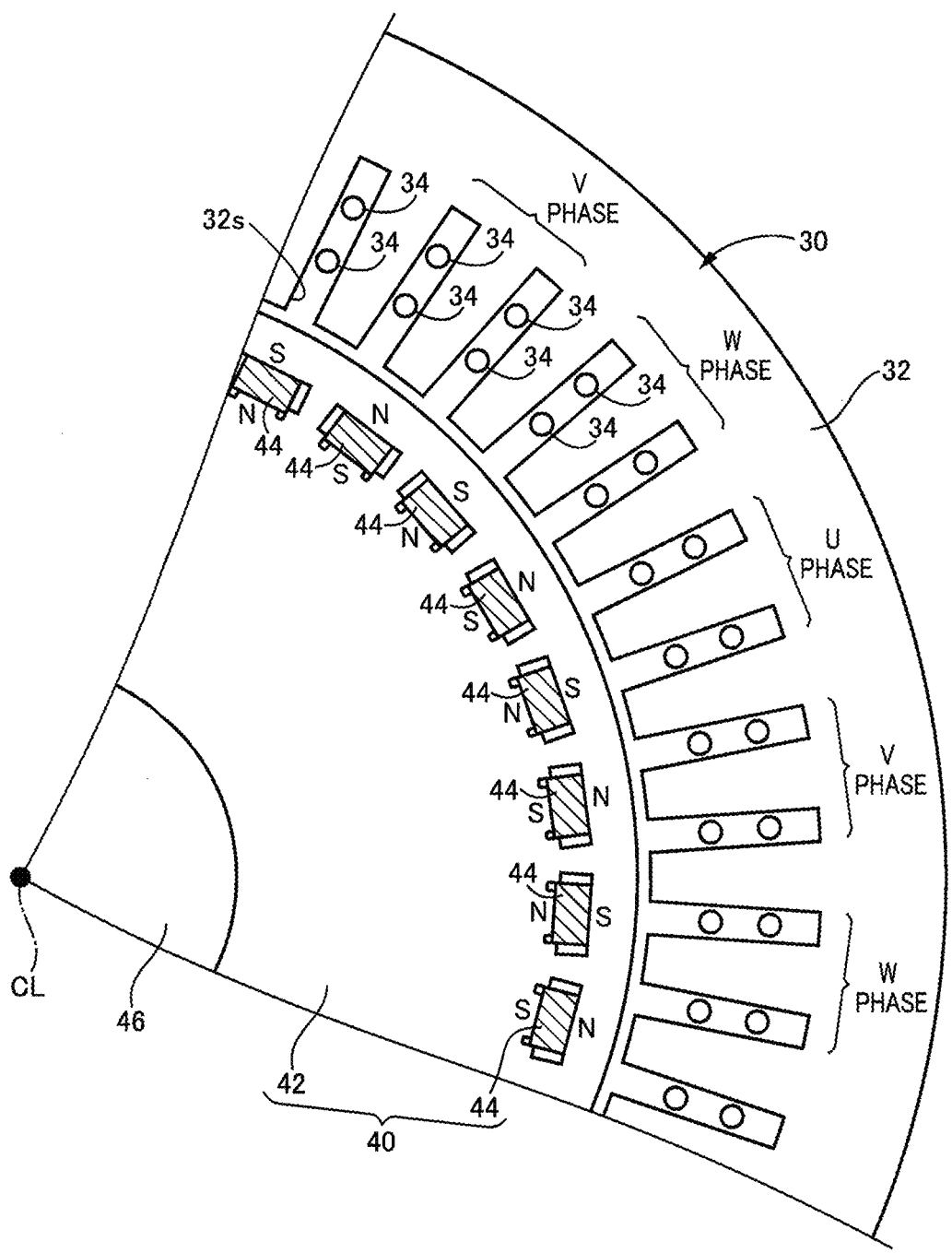
FIG. 2 is a partial sectional view perpendicular to an axis of an electric motor wherein a stator coil of the electric motor is a concentrated winding coil.

FIG. 2 is an example of a partial cross-sectional view perpendicular to the axis CL of the electric motor MG in a case where a stator coil 34 is a concentrated winding coil.

The stator 30 includes a stator core 32 and the stator coil 34. The stator core 32 has a tubular shape centered on the axis CL. A plurality of slots, i.e., stator slots 32s, which have a depth in a direction toward an outer peripheral side in the radial direction and penetrate in the direction of the axis CL, are provided at equal angular intervals around the axis CL in an inner circumferential surface of the stator core 32. Teeth projecting radially inward are formed at equal angular intervals around the axis CL between the adjacent stator slots 32s. A portion of the stator core 32 other than the teeth, which serves as paths of magnetic lines of force between the teeth serving as the electromagnets, is a yoke. The stator coil 34 is wound around the teeth.

When the electric motor MG is driven, a drive current in the form of a three-phase alternating current of a U phase, a V phase and a W phase is supplied to the stator coil 34. For example, the U phase, the V phase and the W phase are sinusoidal waves having a phase difference of 120 degrees. The drive current is a current that is applied to the stator coil 34 to control a motor rotational speed Nmg [rpm] and a motor torque Tmg of the electric motor MG. The motor rotational speed Nmg is a rotational speed of the electric motor MG. The stator 30 generates a rotating magnetic field by the three-phase alternating current of the U phase, the V phase, and the W phase. In the electric motor MG, the phase of the drive current is controlled based on a rotational position of the rotor 40 such that rotation of the rotor 40 can follow the rotating magnetic field generated by the stator 30. The drive current having the sinusoidal waves corresponds to "fundamental wave of the drive current" in the present invention.

The rotor 40 includes a rotor core 42 and permanent magnets 44. The rotor core 42 has a cylindrical shape centered on the axis CL. The rotor shaft 46 is inserted into a hollow portion inside the rotor core 42. The rotor core 42 and the rotor shaft 46 are fitted to each other, for example, so as to be relatively non-rotatable. An outer circumferential surface of the rotor core 42 faces the above-described inner circumferential surface of the stator core 32 in the radial direction. A plurality of rotor slots, which are through holes extending in the direction of the axis CL, are provided in the rotor core 42. The permanent magnets 44 are inserted into the rotor slots such that N poles and S poles of magnetic poles are alternately arranged in the circumferential direction of the rotor core 42. A number of pairs of the magnetic poles in the circumferential direction of the rotor 40, that is, a number of pairs of N and S poles is referred to as "pole pair number".

A number of teeth Z of the drive gear 52 is set such that an order of a torque ripple [Nm] generated in the electric motor MG and an order of a fluctuation of a meshing torque Tgear [Nm] generated in the drive gear 52 coincide with each other. Namely, the drive gear 52 has the number of teeth Z which makes the order of the fluctuation of the meshing torque Tgear coincide with the order of the torque ripple. The "torque ripple" is a pulsation generated in the electric motor torque Tmg due to a density of a magnetic flux being varied by an interaction between the magnetic flux of the permanent magnets 44 and the magnetic flux of the stator coil 34 when the rotor 40 of the electric motor MG is being rotated. The "fluctuation of the meshing torque Tgear" is a pulsation generated in the meshing torque Tgear generated by the meshing of the drive gear 52 with the driven gear 54. The torque ripple and the fluctuation of the meshing torque Tgear cause vibration and noise. The vibration of the drive gear 52 caused by the torque ripple and the fluctuation of the meshing torque Tgear is transmitted to the case 60 via the rotor shaft 46 and the bearings 62, 64, for example. As a result, the case 60 vibrates, and vibration of the vehicle body and noise in the vehicle cabin are generated. Here, the "order" is a frequency (=number of vibrations) that is a specific multiple of the electric motor rotational speed Nmg of the electric motor MG. Specifically, the "order 2" is a frequency that is twice the frequency of the electric motor rotational speed Nmg, and the "order 3" is a frequency that is three times the frequency of the electric motor rotational speed Nmg.

The meshing torque Tgear generated in the drive gear 52 generates a torque fluctuation the number of times corresponding to the number of teeth Z of the drive gear 52, per rotation of the drive gear 52.

As is well known, for example, in the case of a three-phase synchronous motor, the torque ripple having a frequency six times the number of pole pairs of the rotor 40 per rotation is generated.

In FIG. 2, three stator slots 32s are opposed to one pair of poles in the rotor 40. Where the total number of stator slots 32s is Ns (Ns is a multiple of 3), the number of pole pairs of the rotor 40 is Ns/3. The torque ripple is generated (Ns/3)×6=2×Ns [times] per rotation of the rotor 40.

Where the order of the torque ripple and the order of the fluctuation of the meshing torque Tgear coincide with each other, the following expression (1) is satisfied.

$$\frac{Z}{n} = 2 * Ns \quad (1)$$

(where n is a natural number)

Therefore, where the electric motor MG has the configuration of FIG. 2, the number of teeth Z of the drive gear 52, which makes the order of the torque ripple and the order of the fluctuation of the meshing torque Tgear coincide with each other, is obtained by the following expression (2).

$$Z = 2n * Ns \quad (2)$$

(where n is a natural number)

Figure 3:
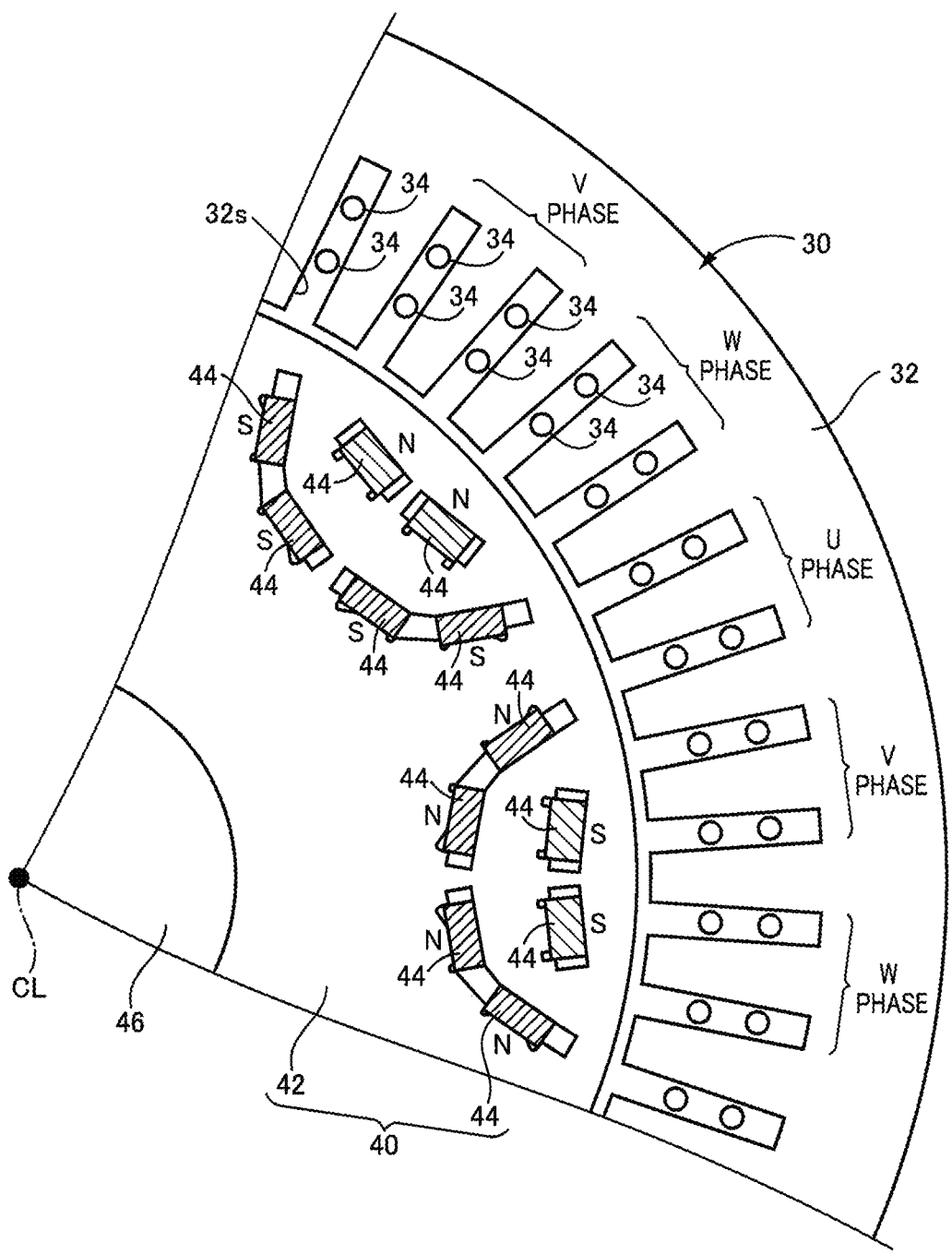
FIG. 3 is a partial sectional view perpendicular to the axis of the electric motor in a case where the stator coil is a distributed winding coil.

FIG. 3 is an example of a partial cross-sectional view perpendicular to the axis CL in the electric motor MG in a case where the stator coil 34 is a distributed winding coil. In FIG. 3, the description will be made mainly on parts different from FIG. 2, and substantially common parts are denoted by the same reference numerals and the description thereof will be omitted as appropriate.

In FIG. 3, twelve stator slots 32s are opposed to one pair of poles in the rotor 40. Where the total number of stator slots 32s is Ns (Ns is a multiple of 6), the number of pole pairs of the rotor 40 is Ns/12. The torque ripple is generated (Ns/12)×6=Ns/2 [times] per rotation of the rotor 40.

Where the order of the torque ripple and the order of the torque fluctuation of the meshing torque Tgear coincide with each other, the following expression (3) is satisfied.

$$\frac{Z}{n} = Ns/2 \quad (3)$$

(where n is a natural number)

Therefore, where the electric motor MG has the configuration of FIG. 3, the number of teeth Z of the drive gear 52, which makes the order of the torque ripple and the order of the fluctuation of the meshing torque Tgear coincide with each other, is obtained by the following expression (4).

$$Z = \left(\frac{n}{2}\right) * Ns \quad (4)$$

(where n is a natural number)

As described above, the number of teeth Z of the drive gear 52 is set based on the number of phases of the alternating current flowing through the stator coil 34, the total number of stator slots 32s and the number of pole pairs of the rotor 40 such that the order of the torque ripple generated in the electric motor MG and the order of the fluctuation of the meshing torque Tgear generated in the drive gear 52 coincide with each other. Since the order of the torque ripple and the order of the fluctuation of the meshing torque Tgear coincide with each other, the occurrence of beat noise, which is interfering noise based on a slight difference between the frequency of the torque ripple and the frequency of the fluctuation of the meshing torque Tgear, is suppressed.

Returning to FIG. 1, control functions of the electronic control device 90 will be described. The electronic control device 90 functionally includes a rotational-fluctuation calculation portion 90a, a rotational-fluctuation determination portion 90b, and a drive control portion 90c.

The rotational-fluctuation calculation portion 90a calculates an actual fluctuation amount ΔNgear of the gear rotational speed Ngear based on the gear rotational speed Ngear. The actual fluctuation amount ΔNgear is an actual fluctuation amount per unit time of the gear rotational speed Ngear. The gear rotational speed Ngear is periodically changed in accordance with the order of the torque ripple (and the order of the fluctuation of the meshing torque Tgear). The actual fluctuation amount ΔNgear is a difference between a maximum value and a minimum value of the gear rotational speed Ngear that is periodically changed. The rotational-fluctuation calculation portion 90a calculates the actual fluctuation amount ΔNgear, for example, at each predetermined sampling time Dt that is sufficiently short to detect the fluctuation of the actual fluctuation amount ΔNgear. The actual fluctuation amount ΔNgear is changed in accordance with the torque ripple and the fluctuation of the meshing torque Tgear. The actual fluctuation amount ΔNgear is increased as a magnitude of combination of waveforms of the torque ripple and the fluctuation of the meshing torque Tgear is increased, and the actual fluctuation amount ΔNgear is reduced as the magnitude of the combination of the waveforms of the torque ripple and the fluctuation of the meshing torque Tgear is reduced. The actual fluctuation amount ΔNgear corresponds to "magnitude of vibration of the gear" and the "fluctuation amount of the rotational speed of the gear" in the present invention.

When the rotational-fluctuation calculation portion 90a calculates the actual fluctuation amount ΔNgear, the rotational-fluctuation determination portion 90b determines whether the actual fluctuation amount ΔNgear exceeds a determination value ΔNgear_jdg. The determination value ΔNgear_jdg is a predetermined determination value of the actual fluctuation amount ΔNgear which is obtained by an experimentation or determined by an appropriate design theory, in order to determine whether or not the vibration caused by the fluctuation of the torque ripple and the meshing torque Tgear is out of an allowable range for vehicle passengers including a vehicle driver. The determination value ΔNgear_jdg corresponds to "predetermined determination value" in the present invention. When the actual fluctuation amount ΔNgear is equal to or smaller than the determination value ΔNgear_jdg, the vibration caused by the torque ripple and the fluctuation of the meshing torque Tgear are within the allowable range for the passengers. When the actual fluctuation amount ΔNgear exceeds the determination value ΔNgear_jdg, the vibration caused by the torque ripple and the fluctuation of the meshing torque Tgear are out of the allowable range for the passengers.

When the rotational-fluctuation determination portion 90b determines that the actual fluctuation amount ΔNgear exceeds the determination value ΔNgear_jdg, the drive control portion 90c executes a harmonic superposition control for superposing a harmonic current on the fundamental wave of the drive current in the drive control of the electric motor MG. The harmonic current has a frequency that can reduce the actual fluctuation amount ΔNgear. For example, the frequency of the harmonic current is the same as or higher than the frequency of the actual fluctuation amount ΔNgear. A waveform of the harmonic current is, for example, a sinusoidal wave.

The harmonic superposition control includes, for example, a feedback control for adjusting a phase of the harmonic current with respect to the fundamental wave of the drive current such that the actual fluctuation amount ΔNgear is reduced. Specifically, when the electronic control device 90 advances the phase of the harmonic current with respect to the fundamental wave, if the actual fluctuation amount ΔNgear is increased, the electronic control device 90 executes the feedback control to delay the phase of the harmonic current. On the other hand, if the actual fluctuation amount ΔNgear becomes smaller, the electronic control device 90 executes the feedback control to further advance the phase of the harmonic current. For example, when the electronic control device 90 delays the phase of the harmonic current with respect to the fundamental wave, if the actual fluctuation amount ΔNgear is increased, the electronic control device 90 executes the feedback control to advance the phase of the harmonic current. On the other hand, if the actual fluctuation amount ΔNgear becomes smaller, the electronic control device 90 executes the feedback control to further delay the phase of the harmonic current. The feedback control for adjusting the phase of the harmonic current corresponds to "first feedback control" in the present invention.

The harmonic superposition control includes, for example, a feedback control for adjusting an amplitude of the harmonic current such that the actual fluctuation amount ΔNgear is reduced. Specifically, when the electronic control device 90 increases the amplitude of the harmonic current, if the actual fluctuation amount ΔNgear is increased, the electronic control device 90 executes the feedback control to reduce the amplitude of the harmonic current. On the other hand, if the actual fluctuation amount ΔNgear becomes smaller, the electronic control device 90 executes the feedback control to further increase the amplitude of the harmonic current. For example, when the electronic control device 90 reduces the amplitude of the harmonic current, if the actual fluctuation amount ΔNgear is increased, the electronic control device 90 executes the feedback control to increase the amplitude of the harmonic current. On the other hand, if the actual fluctuation amount ΔNgear becomes smaller, the electronic control device 90 executes the feedback control to further reduce the amplitude of the harmonic current. The amplitude of the harmonic current is adjusted within a range of amplitude value obtained from a map that is obtained by an experimentation or determined by an appropriate design theory, depending on the magnitude of the actual fluctuation amount ΔNgear, for example. The larger the actual fluctuation amount ΔNgear is, the larger the amplitude value obtained from the map is. The feedback control for adjusting the amplitude of the harmonic current corresponds to "second feedback control" in the present invention.

The drive control portion 90c preferably prioritizes the execution of the first feedback control over the execution of the second feedback control, namely, prioritizes the execution of the feedback control for adjusting the phase of the harmonic current with respect to the fundamental wave of the drive current over the execution of the feedback control for adjusting the amplitude of the harmonic current. This is because the actual fluctuation amount ΔNgear is more quickly reduced where the phase of the harmonic current is adjusted first (for example, where the harmonic current is quickly made to have an opposite phase to the actual fluctuation amount ΔNgear when the frequency of the harmonic current is the same as the frequency of the actual of fluctuation amount ΔNgear) than where the amplitude of the harmonic current is adjusted first.

When the rotational-fluctuation determination portion 90b determines that the actual fluctuation amount ΔNgear is equal to or less than the determination value ΔNgear_jdg, the drive control device 90c does not execute the harmonic superposition control in the drive control of the electric motor MG, that is, executes a normal drive control in which the drive current is only the fundamental wave.

Figure 4:
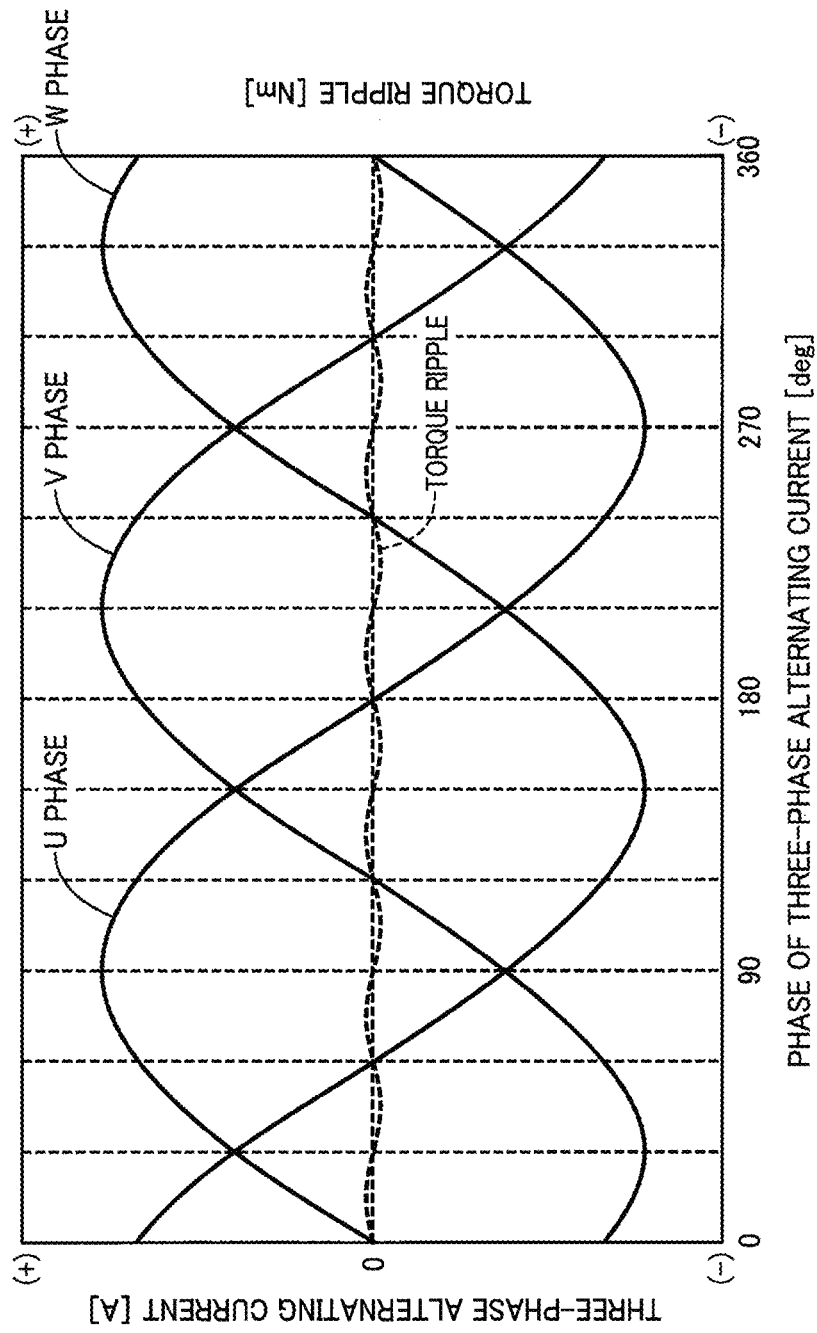
FIG. 4 is a view showing, by way of examples, waveforms of a drive current and a torque ripple in the electric motor that is a three-phase synchronous motor.

FIG. 4 is a view showing, by way of examples, waveforms of the drive current and the torque ripple in the three-phase synchronous motor. In FIG. 4, for easy understanding of the invention, a center position between the maximum value and the minimum value of the amplitude in the waveform of the torque ripple is illustrated as being the same as a center position between the maximum value and the minimum value of the amplitude of the three-phase alternating current.

In the three-phase synchronous motor, the drive current flowing through the stator core 32 is a three-phase alternating current of the U phase, the V phase and the W phase, which are shifted in phase by 120 degrees. As described above, the frequency of the torque ripple is six times the frequency of the three-phase alternating current.

Figure 5:
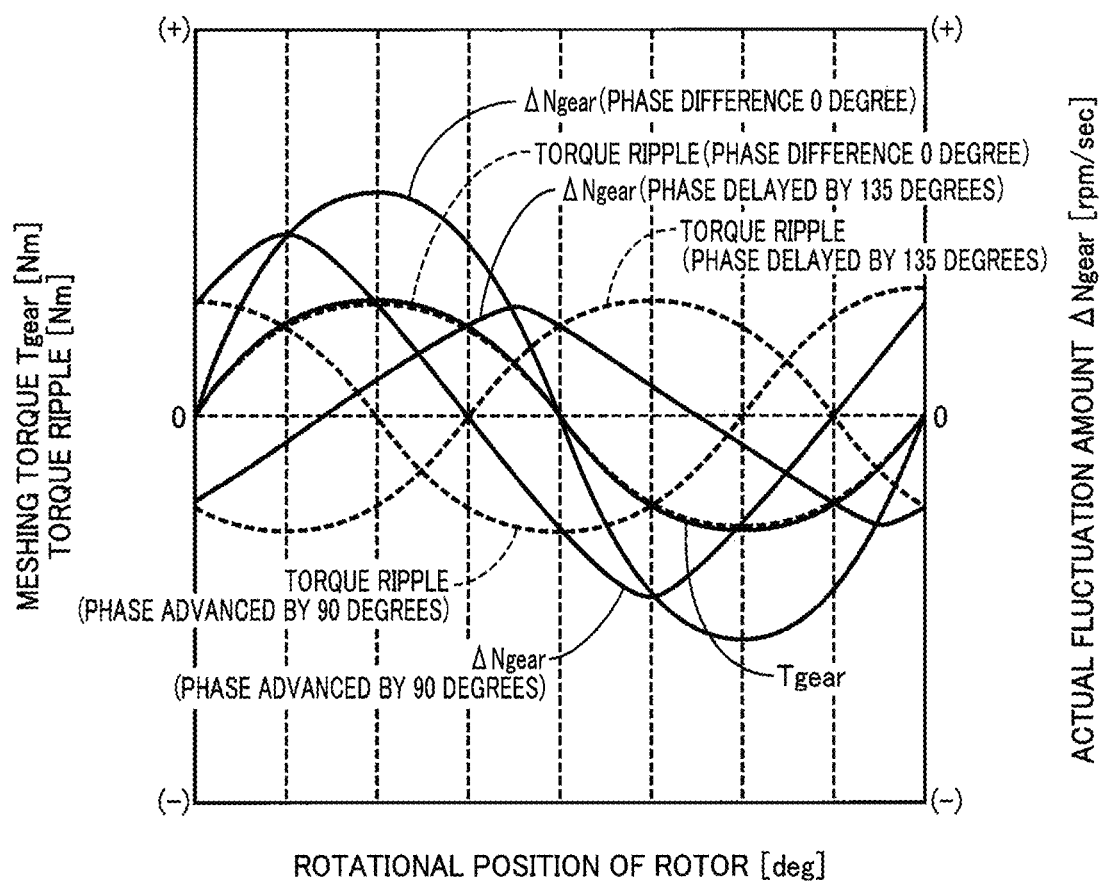
FIG. 5 is a view showing vibration of a drive gear caused by a torque ripple and a fluctuation of a meshing torque.

FIG. 5 is a view showing, by way of example, the vibration of the drive gear 52 caused by the torque ripple and the fluctuation of the meshing torque Tgear. In FIG. 5, for easy understanding of the invention, a center value between the maximum and minimum amplitudes in the waveform of the torque ripple, a center value between the maximum and minimum amplitudes in the waveform of the fluctuation of the meshing torque Tgear and the center value between the maximum and minimum amplitudes in the waveform of the actual fluctuation amount ΔNgear are each shown as zero.

The frequency of the fluctuations in the meshing torque Tgear generated in the drive gear 52 and the frequency of the torque ripple generated in the electric motor MG coincide with each other.

As described above, the torque ripple is the pulsation generated in the electric motor torque Tmg due to the density of the magnetic flux being varied by the interaction between the magnetic flux of the permanent magnets 44 and the magnetic flux of the stator coil 34 when the rotor 40 of the electric motor MG is being rotated. The magnetic flux state of the permanent magnets 44 is determined by a rotational angle of the rotor 40 from a predetermined reference position, and the magnetic flux state of the stator coil 34 is determined by the phase of the fundamental wave of the drive current. Hereinafter, the rotational angle of the rotor 40 from the predetermined reference position is referred to as "rotational position of the rotor 40". Since the rotor core 42 and the rotor shaft 46 are not rotatable relative to each other, the rotational position of the rotor 40 is uniquely determined by the rotational position of the rotor shaft 46. The rotational position of the rotor shaft 46 is a rotational angle from a predetermined reference position of the rotor shaft 46. The rotational position of the rotor 40 (=the rotational position of the rotor shaft 46) is uniquely determined based on the phase of the fundamental wave of the drive current and a load angle. The "load angle" is an angle by which the rotor 40 is delayed with respect to the phase of the fundamental wave of the rotating magnetic field, i.e., the drive current. The load angle is zero when the load of the electric motor MG is zero, and is increased as the load of the electric motor MG is increased. Therefore, the torque ripple generated by the interaction between the magnetic flux of the permanent magnets 44 and the magnetic flux of the stator coil 34 is uniquely determined based on the phase of the fundamental wave of the drive current and the load angle.

As described above, the drive gear 52 is connected to the rotor shaft 46 so as not to be rotatable relative to the rotor shaft 46. Therefore, the fluctuation of the meshing torque Tgear is uniquely determined based on the rotational position of the rotor shaft 46. As described above, where the electric motor MG is a three-phase synchronous electric motor, the rotational position of the rotor shaft 46 is uniquely determined based on the phase of the fundamental wave of the drive current and the load angle. Therefore, the fluctuation of the meshing torque Tgear is uniquely determined based on the load angle and the phase angle of the fundamental wave of the drive current.

Thus, the torque ripple and the fluctuation of the meshing torque Tgear are both uniquely determined based on the load angle and the phase of the fundamental wave of the drive current. Therefore, the difference in phase between the torque ripple and the fluctuation in the meshing torque Tgear is determined by the load angle and the phase of the fundamental wave of the drive current.

FIG. 5 shows (a) a case in which the torque ripple is in phase with the waveform of the fluctuation of the meshing torque Tgear, (b) a case in which the phase of the torque ripple is advanced by 90° relative to the waveform of the fluctuation of the meshing torque Tgear, and (c) a case in which the phase of the torque ripple is advanced by 135° relative to the waveform of the fluctuation of the meshing torque Tgear. The waveform of the vibration of the drive gear 52 is determined by the combination of the waveform of the torque ripple and the waveform of the fluctuation of the meshing torque Tgear.

Figure 6:
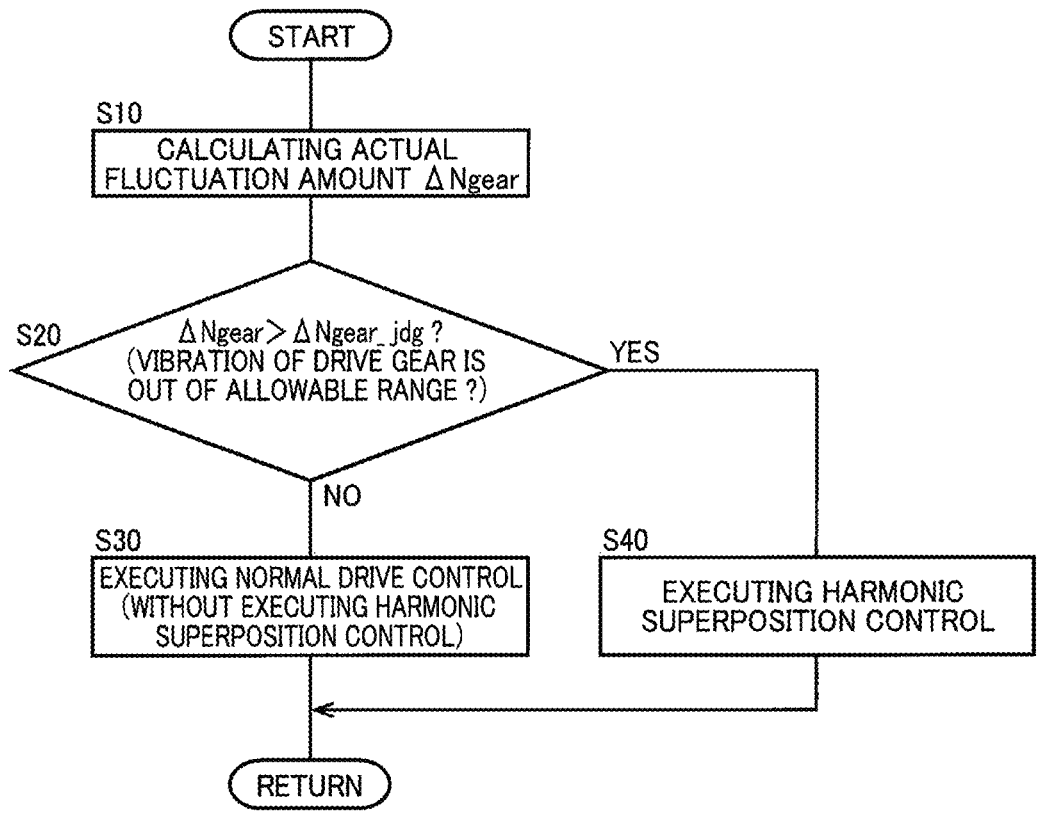
FIG. 6 is an example of a flowchart showing a control operation of an electronic control device shown in FIG. 1.

FIG. 6 is an example of a flowchart showing a control operation of the electronic control device 90 shown in FIG. 1. The flowchart of FIG. 6 is repeatedly executed.

First, step S10 corresponding to function of the rotational-fluctuation calculation portion 90a is implemented to calculate the actual fluctuation amount ΔNgear of the gear rotational speed Ngear.

After the implementation of step S10, step S20 corresponding to function of the rotational-fluctuation determination portion 90b is implemented to determine whether or not the actual fluctuation amount ΔNgear exceeds the determination value ΔNgear_jdg.

When a negative determination (NO) is made at step S20, step S30 corresponding to function of the drive control portion 90c is implemented to execute the normal drive control in which the drive current is only the fundamental wave in the drive control of the electric motor MG, without executing the harmonic superposition control in the drive control of the electric motor MG.

When an affirmative determination (YES) is made at step S20, step S40 corresponding to function of the drive control portion 90c is implemented to execute the harmonic superposition control in the drive control of the electric motor MG.

According to the present embodiment, (a) the number of teeth Z of the drive gear 52 is set such that the order of the torque ripple generated in the electric motor MG and the order of the fluctuation of the meshing torque Tgear generated in the drive gear 52 coincide with each other, and (b) the electronic control device 90 executes the harmonic superposition control for superposing the harmonic current on the fundamental wave of the drive current so as to reduce the actual fluctuation amount ΔNgear when the actual fluctuation amount ΔNgear of the drive gear 52 due to the torque ripple and the fluctuation of the meshing torque Tgear exceeds the determination value ΔNgear_jdg. With the harmonic superposition control being executed, the magnitude of the vibration of the drive gear 52, i.e., the actual fluctuation amount ΔNgear of the drive gear 52 caused by the torque ripple and the fluctuation of the meshing torque Tgear, is suppressed. Thus, the vibration in the drive apparatus 20 is suppressed while suppressing an increase in cost and an increase in weight. For example, where the drive apparatus 20 is mounted on the vehicle 10, vibration of the vehicle body and noise in the vehicle interior are suppressed while increases in cost and weight of the vehicle 10 are suppressed.

According to the present embodiment, the electronic control device 90 executes the feedback control for adjusting the phase of the harmonic current with respect to the fundamental wave in the harmonic superposition control such that the actual fluctuation amount ΔNgear of the drive gear 52 is reduced. The magnitude of the vibration of the drive gear 52 is reduced by adjusting the phase of the harmonic current with respect to the fundamental wave by the feedback control. Thus, the vibration in the drive apparatus 20 is suppressed.

According to the present embodiment, the electronic control device 90 executes the feedback control for adjusting the amplitude of the harmonic current in the harmonic superposition control such that the magnitude of the vibration of the drive gear 52 is reduced. The amplitude of the harmonic current is adjusted by the feedback control, whereby the magnitude of the vibration of the drive gear 52 is reduced. Thus, the vibration in the drive apparatus 20 is suppressed.

According to the present embodiment, the execution of the feedback control for adjusting the phase of the harmonic current with respect to the fundamental wave of the drive current is given priority over the feedback control for adjusting the amplitude of the harmonic current. The actual fluctuation amount ΔNgear is quickly reduced and the magnitude of the vibration of the drive gear 52 is quickly reduced, where the phase of the harmonic current is adjusted earlier (for example, where the harmonic current is quickly made to have an opposite phase to the actual fluctuation amount ΔNgear when the frequency of the harmonic current is the same as the frequency of the actual fluctuation amount ΔNgear) than where the amplitude of the harmonic current is adjusted earlier.

According to the present embodiment, the electronic control device 90 determines the magnitude of the vibration of the drive gear 52 based on the actual fluctuation amount ΔNgear of the gear rotational speed Ngear that is changed in accordance with the magnitude of the vibration of the drive gear 52. The gear rotational speed Ngear, which is the rotational speed of the drive gear 52, is equal to the electric motor rotational speed Nmg, which is the rotational speed of the electric motor MG. The rotational position of one of the drive gear 52 and the rotor 40 is uniquely determined based on the rotational position of the other. Where the rotation control of the electric motor MG is executed based on the electric motor rotational speed Nmg and the rotational position of the rotor 40, it is not necessary to provide additional sensor or sensors for detecting the gear rotational speed Ngear and the rotational position of the rotor 40. Therefore, the vibration in the drive apparatus 20 is suppressed while suppressing an increase in cost and an increase in weight.

Although the embodiment of the present invention has been described in detail with reference to the drawings, the present invention is also applicable to other aspects.

In the above-described embodiment, the fundamental wave of the drive current is a sinusoidal wave, but the present invention is not limited thereto. For example, the fundamental wave of the drive current may be a rectangular wave or a trapezoidal wave.

In the above-described embodiment, the electric motor MG is a three-phase synchronous electric motor, but the present invention is not limited thereto. For example, the electric motor MG may be an electric motor driven by a two-phase alternating current or a four-phase alternating current.

In the above-described embodiment, the electric motor MG is of an embedded magnet type, but the present invention is not limited thereto. For example, the electric motor MG may be a surface-magnet type electric motor.

In the above-described embodiment, the determination is made based on the actual fluctuation amount ΔNgear that is changed in accordance with the magnitude of the vibration of the drive gear 52, instead of the "magnitude of the vibration of the drive gear 52". However, the present invention is not limited thereto. For example, instead of the "magnitude of vibration of the drive gear 52", the determination may be made based on an actual fluctuation amount per unit time of the rotational speed of the driven gear 54 that is changed in accordance with the magnitude of vibration of the drive gear 52. For example, instead of "the magnitude of the vibration of the drive gear 52", a sound pressure waveform generated from the drive gear 52, which is changed in accordance with the magnitude of the vibration of the drive gear 52, may be detected by a sound pressure sensor, and the determination may be made based on an actual fluctuation amount per unit time of the sound pressure waveform.

In the above-described embodiment, the harmonic superposition control includes the feedback control for adjusting the phase of the harmonic current and the feedback control for adjusting the amplitude of the harmonic current. However, the present invention is not limited thereto. For example, the harmonic superposition control may include the feedback control for adjusting the phase of the harmonic current, but may not include the feedback control for adjusting the amplitude of the harmonic current. In this case, the amplitude of the harmonic current is set to an amplitude value obtained from a map that is obtained by an experimentation or determined by an appropriate design theory, in accordance with the magnitude of the actual fluctuation amount ΔNgear, for example.

In the above-described embodiment, the harmonic superposition control is not executed in a case in which the actual fluctuation amount ΔNgear is equal to or smaller than the determination value ΔNgear_jdg. However, in this case, too, the harmonic superposition control may be executed.

In the above-described embodiment, the electric motor MG is a motor generator, but the present invention is not limited thereto. For example, the electric motor MG may be an electric motor that does not have a generator function and has only an electric motor function.

The above description is merely the embodiment of the present invention, and the present invention can be implemented in a mode in which various modifications and improvements are added based on the knowledge of those skilled in the art without departing from the scope of the present invention.

NOMENCLATURE OF ELEMENTS

20: drive apparatus
30: stator
32: stator core
34: stator coil
40: rotor
46: rotor shaft (shaft)
52: drive gear (gear)
90: electronic control device (control device)
MG: electric motor
Tgear: meshing torque
Z: number of teeth
ΔNgear: actual fluctuation amount (magnitude of vibration of gear)
ΔNgear_jdg: determination value (predetermined determination value)

What is claimed is:

1. A drive apparatus comprising:
an electric motor including a rotor and a stator that has a stator core and a stator coil;
a gear connected to a shaft of the rotor; and
a control device configured to control a drive current flowing through the stator core,
wherein the gear has a number of teeth which makes an order of a fluctuation of a meshing torque generated in the gear coincide with an order of a torque ripple generated in the electric motor, and
wherein, when a magnitude of vibration of the gear caused by the torque ripple and the fluctuation of the meshing torque exceeds a predetermined determination value, the control device is configured to execute a harmonic superposition control for superposing a harmonic current on a fundamental wave of the drive current such that the magnitude of the vibration of the gear is reduced.

2. The drive apparatus according to claim 1,
wherein the control device is configured to execute a feedback control for adjusting a phase of the harmonic current with respect to the fundamental wave in the harmonic superposition control such that the magnitude of the vibration of the gear is reduced.

3. The drive apparatus according to claim 1,
wherein the control device is configured to execute a feedback control for adjusting an amplitude of the harmonic current in the harmonic superposition control such that the magnitude of the vibration of the gear is reduced.

4. The drive apparatus according to claim 1,
wherein the control device is configured to execute a first feedback control for adjusting a phase of the harmonic current with respect to the fundamental wave in the harmonic superposition control such that the magnitude of the vibration of the gear is reduced, and is configured to execute a second feedback control for adjusting an amplitude of the harmonic current in the harmonic superposition control such that the magnitude of the vibration of the gear is reduced, such that execution of the first feedback is prioritized over execution of the second feedback control.

5. The drive apparatus according to claim 1, wherein the control device is configured to determine the magnitude of the vibration of the gear based on a fluctuation amount of a rotational speed of the gear that is changed in accordance with the magnitude of the vibration of the gear.

\* \* \* \* \*